United States Patent
Tambornino (10) Patent No.: US 7,195,269 B2
(45) Date of Patent: Mar. 27, 2007

(54) HITCH

(75) Inventor: Curt Tambornino, Fall Creek, WI (US)

(73) Assignee: Curt Manufacturing, Inc., Eau Claire, WI (US)

(*) Notice: Subject to any disclaimer, the term of this patent is extended or adjusted under 35 U.S.C. 154(b) by 0 days.

(21) Appl. No.: 11/126,722

(22) Filed: May 11, 2005

(65) Prior Publication Data

US 2006/0255561 A1 Nov. 16, 2006

(51) Int. Cl.
*B60D 1/06* (2006.01)

(52) U.S. Cl. .................................... 280/491.1; 280/511

(58) Field of Classification Search ............ 280/490.1, 280/491.2, 491.5, 504, 506, 511
See application file for complete search history.

(56) References Cited

U.S. PATENT DOCUMENTS

| | | | |
|---|---|---|---|
| 4,746,138 A * | 5/1988 | James | 280/487 |
| 5,380,030 A * | 1/1995 | Gullickson | 280/486 |
| 5,503,422 A | 4/1996 | Austin | |
| 5,549,316 A | 8/1996 | Jones | |
| 5,735,539 A | 4/1998 | Kravitz | |
| 5,765,850 A * | 6/1998 | Emerson | 280/490.1 |
| 5,884,931 A | 3/1999 | McCoy | |
| 6,203,048 B1 | 3/2001 | Adair | |
| 6,234,510 B1 | 5/2001 | Hammons | |
| 6,302,426 B1 * | 10/2001 | Denny | 280/511 |
| 6,481,258 B1 | 11/2002 | Belinky | |
| D466,844 S | 12/2002 | Billings | |
| D469,723 S | 2/2003 | McCoy et al. | |
| 6,536,794 B2 | 3/2003 | Hancock et al. | |
| 6,581,953 B2 | 6/2003 | Jerry | |
| 6,709,002 B2 | 3/2004 | Tambornino | |
| 6,746,038 B2 | 6/2004 | McCoy et al. | |
| 2002/0140205 A1 | 10/2002 | Adams | |
| 2002/0171226 A1 * | 11/2002 | McCoy et al. | 280/491.5 |
| 2004/0100066 A1 * | 5/2004 | Andersen | 280/511 |
| 2005/0040623 A1 * | 2/2005 | Krespach et al. | 280/511 |
| 2005/0173893 A1 * | 8/2005 | Buckley et al. | 280/504 |

* cited by examiner

*Primary Examiner*—Tony Winner
(74) *Attorney, Agent, or Firm*—Shewchuk IP Services; Jeffrey D. Shewchuk (57) ABSTRACT

A hitch includes a hitch engagement, a hitch tongue and a connecting bridge portion which are forged or otherwise formed as a single, integral, monolithic metal structure. The hitch engagement includes a recess exposed on its bottom side which significantly reduces the weight and material cost of the hitch. The hitch includes generally uniform wall thicknesses with the exception of stress pyramids of greater thickness disposed on the side walls of the bridge portion. A front wall to the hitch engagement is provided which slopes relative to the longitudinal axis of the hitch and connects the side walls bounding the recess. An anti-vibration device can be used within the recess to prevent the hitch from rattling in the hitch receiver.

18 Claims, 6 Drawing Sheets

FIG. 15

HITCH

CROSS-REFERENCE TO RELATED APPLICATION(S)

None.

BACKGROUND OF THE INVENTION

The present invention relates to ball hitches, and more particularly, to ball hitches having a hitch tongue attached to a hitch engagement, which is in turn received in a hitch receiver on the towing vehicle.

Ball hitches are used in a wide variety of towing applications for towing many different kinds of trailers. Ball hitches may be mounted to vehicle bumpers and/or hitch drawbars, and in some applications mounted in the bed of a pickup truck. A common method of attaching the ball hitch to the vehicle is using a female hitch receiver mounted on the vehicle. The female hitch receiver defines a sleeve, typically of a generally square cross-sectional shape, which receives the leading end of a hitch tube or hitch engagement of corresponding shape and size, such that the leading end of the hitch engagement may be slid into the receiver. The hitch engagement is removably attached to the hitch receiver such as by a locking pin which passes through corresponding holes in the hitch receiver and the hitch engagement. The ball is then supported by the trailing end of the hitch, such as on a hitch tongue.

Such ball hitches need to be strong and reliable, while maintaining a relatively low cost. One such ball hitch is disclosed in U.S. Pat. No. 6,709,002, incorporated herein by reference. Improvements which increase the strength and/or reliability of the ball hitch, while simultaneously reducing costs such as in manufacturing and assembly, are very beneficial.

BRIEF SUMMARY OF THE INVENTION

The present invention is a hitch for use with a hitch receiver of a towing vehicle. The hitch engagement which mates with the hitch receiver is not provided as a tube, but rather is provided with side walls which define a recess accessible on the hitch engagement. In one aspect, the entire hitch is forged as a single, integral, monolithic metal structure. The recess significantly reduces the weight and material cost of the hitch. In another aspect, a connection bridge between the hitch tongue and the hitch engagement includes stress pyramids of greater thickness than the side walls of the hitch engagement. In yet another aspect, an anti-vibration device is used within the recess to prevent the hitch from rattling in the hitch receiver.

While the above-identified drawing figures set forth a preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

As shown in FIGS. 1–13, a preferred embodiment of a hitch 20 in accordance with the present invention includes a hitch engagement 22, a hitch tongue 24, and a bridging portion 26 joining the hitch engagement 22 and hitch tongue 24. The preferred hitch is symmetrical about a vertical, longitudinally extending midplane. The hitch engagement 22 is sized to be received in a female sleeve of a hitch receiver (not shown) on the towing vehicle (not shown) as known in the art, and its cross-sectional dimensions are selected in accordance with the type of hitch receiver with which it will be used. For instance, a common shape and size for the hitch receiver provides a two inch by two (2×2) inch square opening, while another common shape and size provides a one and one-half by one and one-half (1½×1½) inch square opening. The hitch engagement 22 is of the same size and outer cross-sectional shape as the hitch receiver opening, such that the hitch engagement 22 can be received in the hitch receiver in a coaxial arrangement.

The hitch engagement 22 includes two aligned locking pin holes 28. Once the hitch 20 is inserted and positioned at its proper axial position within the hitch receiver, a locking pin (not shown) can then be used as known in the art to removably secure the hitch 20 to the hitch receiver. The preferred locking pin holes 28 are circular and about ⅔ inch in diameter. As used in the present application, the term "hitch engagement" refers to that length of the hitch 20 which is received within a standard hitch receiver, which is defined (if locking pin holes 28 are included) based upon the longitudinal position of the hitch 20 where the locking pin holes 28 align between the hitch 20 and the hitch receiver. If locking pin holes are not provided on the hitch, the term "hitch engagement" still refers to that length of the hitch which is received within a hitch receiver with other structure determining the longitudinal position of the hitch relative to the hitch receiver.

In prior art arrangements, hitch engagements are commonly provided as hitch tubes formed out of steel tubular stock. In contrast to such prior art tubular arrangements, the hitch engagement 22 of the present invention is not a tubular structure, but rather includes a recessed side. The preferred hitch engagement 22 includes its bottom as its recessed side, and thus includes longitudinally extending right and left side walls 30 and a longitudinally extending top wall 32 about a recess 34.

Figures 9, 10, 11, 12:
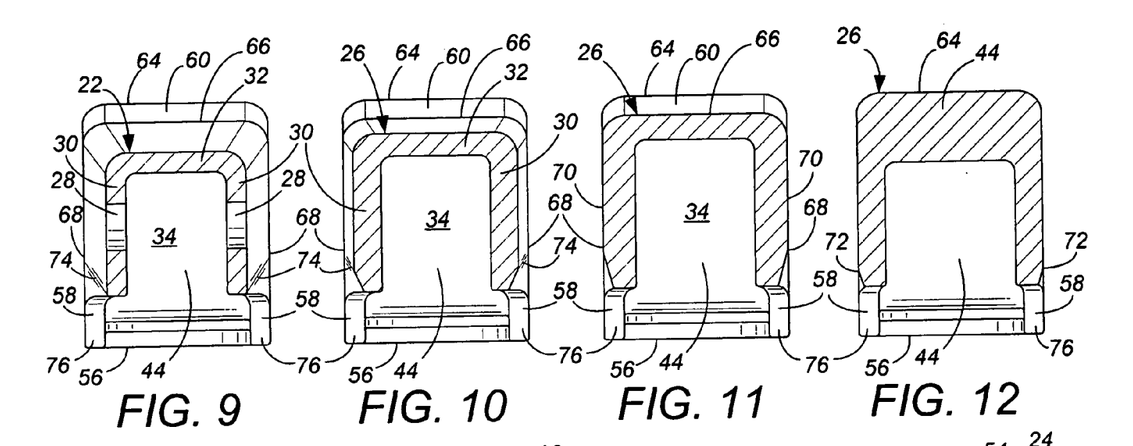
FIG. 9 is a cross-sectional view taken along lines 9—9 in FIG. 8.
FIG. 10 is a cross-sectional view taken along lines 10—10 in FIG. 8.
FIG. 11 is a cross-sectional view taken along lines 11—11 in FIG. 8.
FIG. 12 is a cross-sectional view taken along lines 12—12 in FIG. 8.

The left, right and top walls 30, 32 are all preferably formed of an equal thickness, and, as best shown in FIG. 9, the defined recess 34 makes up at least ¼ of the cross-sectional area of the hitch engagement 22. That is, for a 2×2 inch hitch receiver, the side walls 30 and top wall 32 are all preferably ⅔ inch or less in thickness, so the defined recess 34 is at least one square inch (⅔×4/3). More preferably, the recess 34 makes up at least ½ of the cross-sectional area of the hitch engagement 22. Thinner walls 30, 32 make the hitch 20 lighter and less costly in terms of materials, but sacrifice in strength. In the preferred embodiment, the side walls 30 and top wall 32 are all about 0.31 inches thick, so the recess 34 is about 1.38×1.69 inches, i.e., the recess 34 makes about 2.3 square inches of the 4 square inch cross-sectional perimetric profile of the hitch engagement 22. The term "perimetric", as used herein, refers to the shape which would be created if the concave recess 34 were filled in with a straight line perpendicular to the longitudinal axis.

If desired, part of the recess 34 could be provided above the horizontal wall, either in whole or in part, so the cross-section of the hitch engagement 22 would have an "H" shape or a "U" shape rather than the upside-down "U" shape shown. An "H" shape in particular can provide some manufacturing benefits, without a significant decrease in strength. If formed as either a "U" shape or an "H" shape, of combinations thereof, the horizontal wall should be at a height to avoid interference with the through holes 28. With the preferred upside-down U. shape shown, the horizontal wall 32 provides ample clearance for the through holes 28. The upside-down "U" shape further avoids any sort of a catch-recess which could gravitationally retain rain water during use, thus assisting in fighting corrosion.

Figures 1, 2:
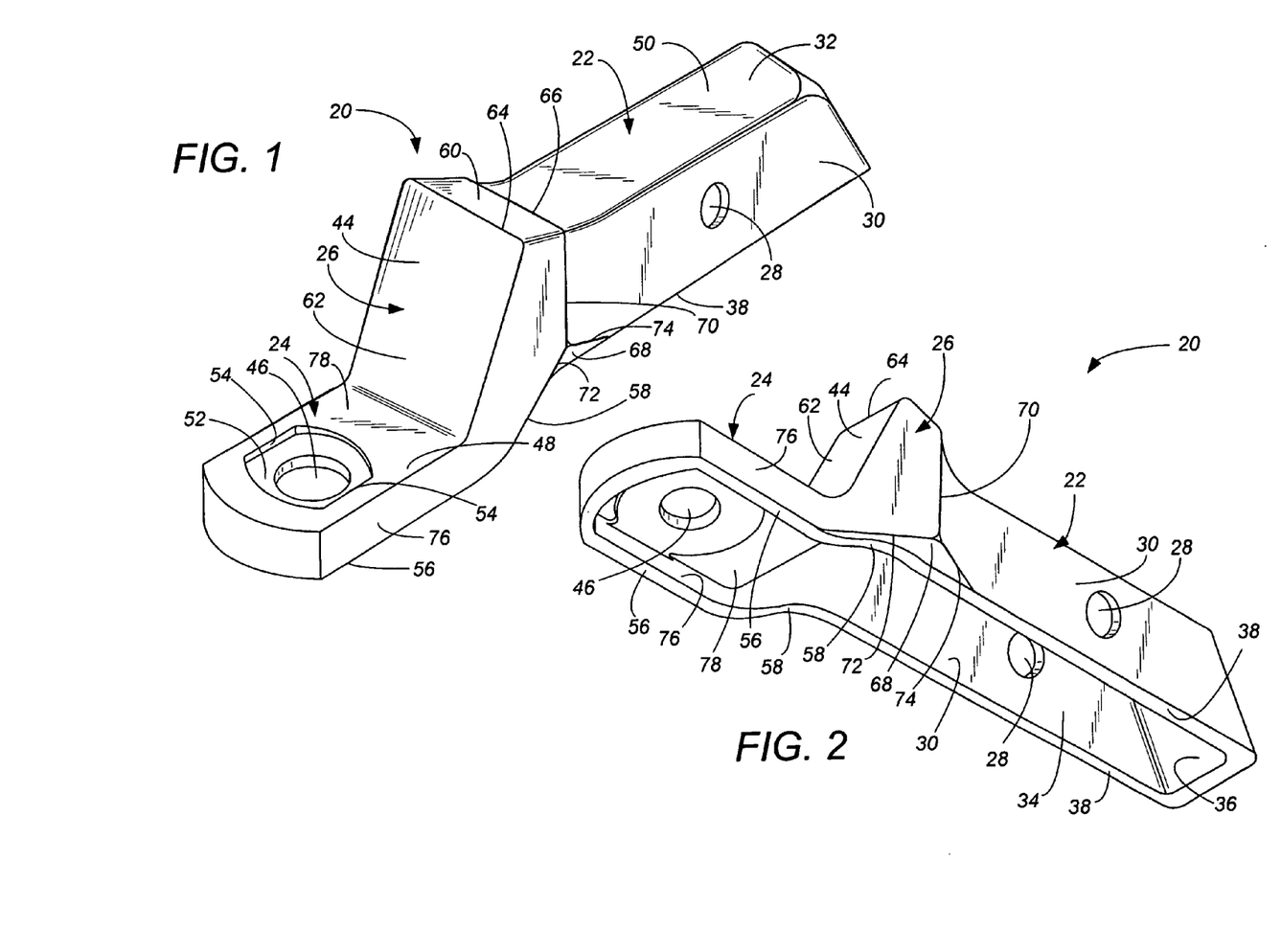
FIG. 1 is a perspective view from above showing a first embodiment of a hitch in accordance with the present invention.
FIG. 2 is a perspective view from below showing the hitch of FIG. 1.
Figure 3:
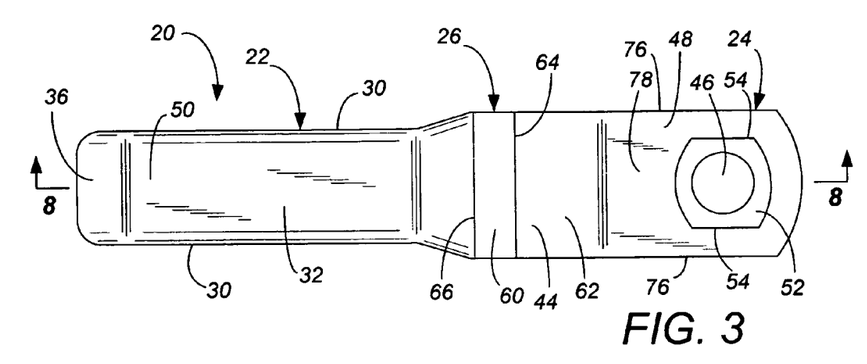
FIG. 3 is top plan view of the hitch of FIGS. 1–2.
Figure 4:
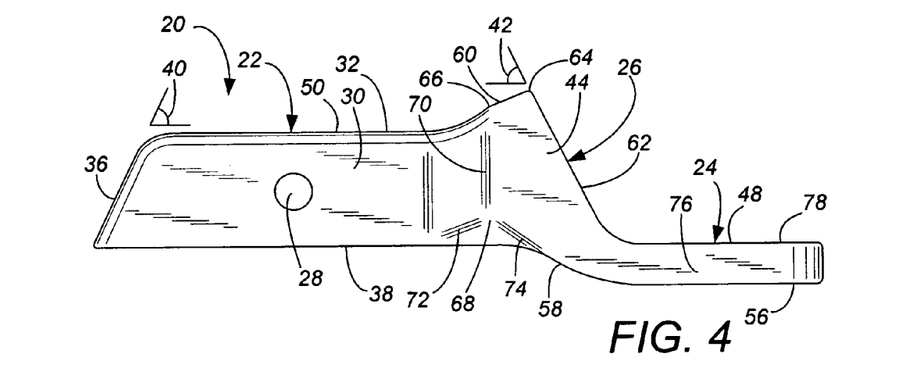
FIG. 4 is a side elevational view of the hitch of FIGS. 1–3. The opposite side elevational view is a mirror image of FIG. 4.
Figure 5:
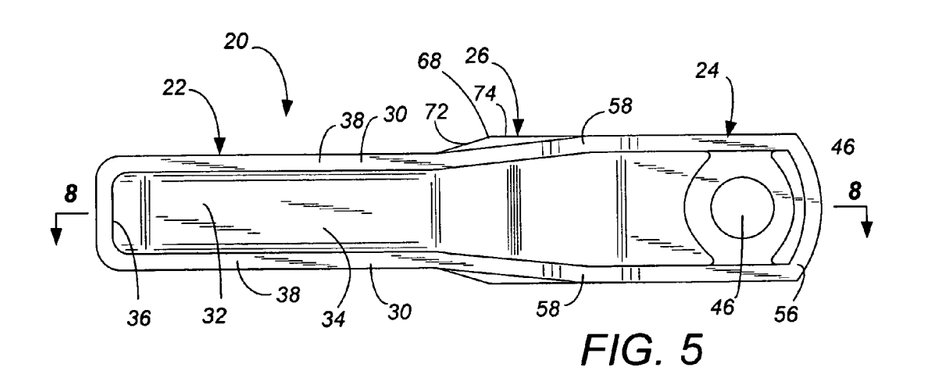
FIG. 5 is a bottom plan view of the hitch of FIGS. 1–4.
Figure 6:
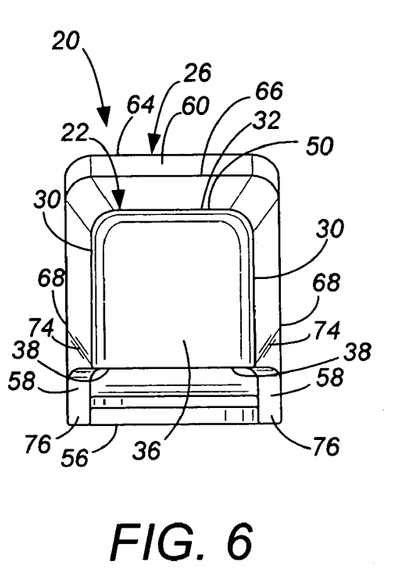
FIG. 6 is a rear view of the hitch of FIGS. 1–5.
Figure 7:
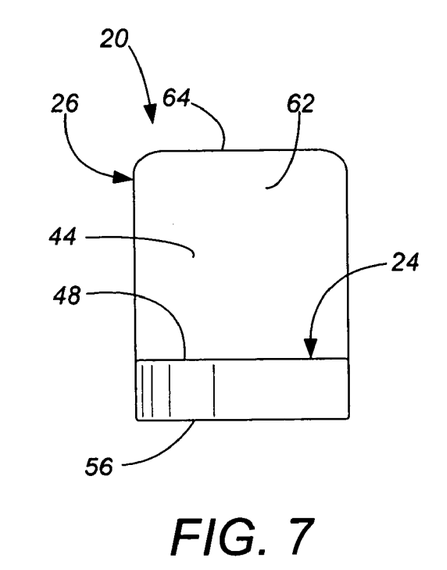
FIG. 7 is a front view of the hitch of FIGS. 1–6.
Figures 8, 13:
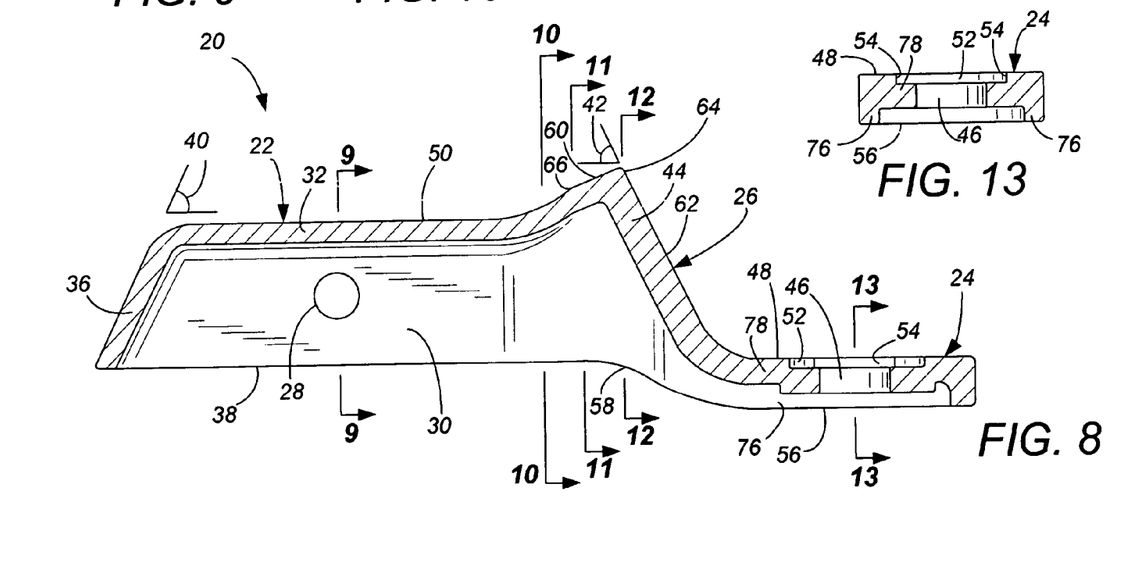
FIG. 8 is a cross-sectional view taken along lines 8—8 in FIGS. 3 and 5.
FIG. 13 is a cross-sectional view taken along lines 13—13 in FIG. 8.

As best shown in FIG. 8, the recess 34 extends longitudinally in the hitch engagement 22. Preferably, the recess 34 terminates at the leading end of the hitch engagement 22 due to a front wall 36. The front wall 36 is aesthetically pleasing, but also serves an important purpose associated with the recessed hitch engagement 22. Namely, in contrast to prior art tubular structures, the bottom edges 38 of the left side wall 30 and right side wall 30 in the inventive hitch engagement 22 are not horizontally supported. Wear and tear on the hitch 20 could cause one or both of the bottom edges 38 to move laterally, i.e., to become narrower, or, more detrimentally, to become wider. If bending of the hitch engagement 22 causes the bottom edges 38 of the left side wall 30 and the right side wall 30 to expand beyond 2 inches, the user will not be able to insert the hitch 20 into the hitch receiver. Alternatively, if the bottom edges 38 of the left side wall 30 or the right side wall 30 are slightly bent either during use or prior to insertion followed by thermocycling and/or corrosion expansion of the hitch 20, insertion of the hitch engagement 22 into the hitch receiver may be possibly followed by the hitch engagement 22 locking up within the hitch receiver. The front wall 36 greatly strengthens the bottom edges 38 of the left and right side walls 30 and in all but catastrophic events ensures that the spacing between the bottom edges 38 remains at 2 inches and in squareness vertically below the top wall 32. The front wall 36 thus greatly helps to ensure that the user can always easily insert and remove the hitch 20 from the hitch receiver, without worrying that wear, tear and thermal and corrosion effects might change the spacing and alignment between the bottom edges 38 of the side walls 30.

The recess 34 should extend at least half of the length of the hitch engagement 22. The locking pin holes 28 need to be positioned on the hitch engagement 22 to enable alignment with the locking pin holes of standard hitch receivers. For a standard 2×2 hitch receiver, the locking pin holes 28 are centered approximately 2½ inches from the end of the female hitch receiver tube. The hitch engagement 22 extends significantly forward of the locking pin holes 28, such that the front wall 36 is entirely in front of the locking pin holes 28, with the recess 34 running from the trailing end of the hitch engagement 22 up to at least the locking pin holes 28. Thus, the recess 34 extends for at least 2.9 inches (enough to fully include the outside diameter of the locking pin holes 28), for a hitch engagement 22 which is about 5.8 inches long.

In the preferred embodiment, the exterior surface of the front wall 36 extends at a non-perpendicular angle 40 (10° to 89°) to the longitudinal axis, such as from 40° to 80°. In part this is aesthetically pleasing, with the angle 40 of the front wall 36 matching the angle 42 of the bridge plate 44 for a symmetric look as shown in FIG. 8. Beyond the aesthetically pleasing appearance, however, providing an angle 40 to the front wall 36 makes the hitch 20 easier to insert into the hitch receiver. Providing an angle 40 to the front wall 36 also makes the hitch 20 easier to uniformly form from the preferred forging method discussed below. In the preferred embodiment, the front wall 36 extends at an angle 40 between 50 and 70° to the longitudinal axis, with the preferred angle 40 being about 63°. At this angle 40 (for a 2×2 hitch), the exterior surface of the front wall 36 extends longitudinally over about 1 inch at the same time as it extends vertically over about 2 inches.

In the preferred embodiment, the front wall 36 has the same wall thickness as the left, right and top walls 30, 32. The wall thicknesses of the front, left, right and top walls 36, 30, 30, 32 relative to the perimetric volume of the hitch 20 contribute significantly to the weight of the hitch 20. The recess 34 preferably provides at least about ⅕$^{th}$ of the perimetric volume of the hitch 20, and more preferably provides about ½ or more of the perimetric volume of the hitch 20. The perimetric volume of the preferred embodiment (i.e., the volume if the hitch engagement 22 were provided as a solid mass without the recess 34) (for a 2×2 hitch) is about:

$$(2\,\text{in} \times 2\,\text{in} \times 5.8\,\text{in})(\text{overall volume}) -$$
$$0.7\,\text{in}^3 (\text{locking pin hole volume}) -$$
$$\underline{2\,\text{in}^3 (\text{subtract for angled front wall 36})}$$
$$20.5\,\text{in}^3 (\text{perimetric volume})$$

If a wall thickness of ⅔ inch is used, the volume of the hitch engagement 22 is reduced to about:

20.5 in³ (perimetric volume) −

(2/3 in × 4/3 in × 4.8 in)(recess volume) +

(2/3 in × .35 in²)

(add to prevent double subtraction of locking pin hole volume).

16.5 in³ (approximated true voloume)

That is, with a ⅔ inch wall thickness, the recess 34 makes up about ⅕$^{th}$ of the perimetric volume of the hitch engagement 22. For the preferred wall thickness of about 0.31 inches, the volume of the hitch engagement 22 is reduced to about:

20.5 in³ (perimetric volume) −

(1.38 in × 1.69 × 5.07 in)(recess volume) +

(0.62 in × .35 in²)

(add to prevent double subtraction of locking pin hole volume).

8.9 in³ (estimated true volume)

That is, with a 0.31 inch wall thickness, the recess 34 makes up about 57% of the perimetric volume of the hitch engagement 22 resulting in a hitch engagement 22 which is about 57% lighter than if formed as a solid mass.

At the opposite end of the hitch 20 from the hitch engagement 22, the hitch 20 provides a hitch tongue 24 including a hitch ball hole 46. As used in the present application, the "hitch tongue" includes that portion of the hitch 20 which extends horizontally outside the hitch receiver and attaches to the hitch ball. The circular hole 46 in the hitch tongue 24 allows for ready attachment of the desired hitch ball (not shown), such as with a hitch ball post of the hitch ball extending through the circular hole 46. Alternative methods of attachment of the hitch ball to the hitch tongue 24 are acceptable. The hitch ball hole 46 can be sized in accordance with prior art hitches, in this case having a diameter of about 1 inch. In the preferred embodiment, the hitch tongue 24 has a width of about 2⅝ inches, a length of about 3⅛ inches and a height of about ¾ inch.

In the preferred embodiment, the top surface 48 of the hitch tongue 24 is coplanar with the bottom surface 38 of the hitch engagement 22. For a 2×2 hitch, this places the top surface 48 of the hitch tongue 24 at a two inch drop from the top surface 50 of the hitch engagement 22. Many other elevations of the hitch tongue 24 relative to the hitch engagement 22 can alternatively be used.

If desired, the top surface 48 of the hitch tongue 24 may be planar and flat. More preferably, the top surface 48 of the hitch tongue 24 includes a recess 52 about the hitch ball hole 46 with two flats 54 for receiving a ball mount. In accordance with prior art ball mounts, the shape of the recess 52 may generally be circular with about a 2 inch diameter, with the flats 54 being parallel and spaced about 1⅔ inches apart. The 2⅝ width of the hitch tongue 24 leaves nearly ½ inch of width to the right and left of the flats 54, and the 3⅛ length leaves just over ½ inch of length leading and trailing the circular arcs of the ball mount recess 52. The preferred recess 52 is about 0.1 inches deep.

The bridge portion 26 is disposed in between the hitch engagement 22 and the hitch tongue 24. The bridge portion 26 transfers stress between the hitch tongue 24 and the hitch engagement 22, and must be strong enough to withstand the different directions of stress transferred. The bridge portion 26 also determines the height of the hitch tongue 24 relative to the hitch engagement 22. With a ¾ inch hitch tongue thickness and the preferred drop of the hitch tongue 24, the bridge portion 26 bridges from the bottom edge 38 of the hitch engagement 22 downward for ¾ inch to the bottom edge 56 of the hitch tongue 24. The preferred bridge portion 26 makes the ¾ inch drop with smooth, flowing S curves 58.

The upper face 60 and trailing face 62 of the bridge portion 26 define the bridge plate 44 which provides overall structural integrity to the hitch 20. In contrast to prior art two-piece hitches, however, the bridge portion 26 for an integral, monolithic structure can support stress between the hitch tongue 24 and the hitch engagement 22 without an inherent weakness of a weld connection line. Without a weld connection line, many of the geometric constraints (and particularly geometric constraints associated with creating solid weld surfaces) of prior art bridge portions are removed. Thus, the upper and trailing surface shapes of the hitch 20 may take many ornamental forms. In the preferred embodiment, the bridge plate 44 provides a trailing surface 62 generally as a plane, inclined at a non-perpendicular angle 42 to the longitudinal axis of the hitch 20. The angle 42 of the trailing surface 62 is preferably at 50 to 70°, and the preferred trailing surface 62 is disposed at about a 63° angle 42 to the horizontal longitudinal axis. This angle 42 provides an aesthetically pleasing surface profile to the hitch 20, but also provides structural benefits. In particular, the angle 42 gives ample access on the top of the hitch tongue 24 so that upper portions of the hitch 20 do not interfere with subsequent attachment of a trailer tongue (not shown) to the hitch 20. For instance, the angle 42 of the trailing surface 62 of the bridge portion 26 permits a user's knuckles to not be squeezed between the ball receiving tongue of the trailer (not shown) and hitch 20 during attachment of the ball-receiving tongue of the trailer over the ball. In the preferred embodiment, the upper face 60 of the bridge plate 44 is ornamentally disposed perpendicular to the trailing face 62 of the bridge plate 44, meeting at an upper corner 64. The upper face 60 is ornamentally given a break line 66 about ¾ inch from the upper corner 64, to mimic the ¾ inch thickness of the hitch tongue 24.

Particularly to withstand horizontal bending stresses to which the hitch 20 may be subjected during use, the bridge portion 26 should widen relatively quickly from the 2 inch width of the hitch engagement 22 to the wider width of the hitch tongue 24. The preferred bridge portion 26 accomplishes this with a pyramidal shape 68. The apex of the pyramidal shape 68 is about 1 inch from the trailing end of the hitch engagement 22, and the preferred embodiment includes a smoothly flowing blend from the width of the hitch engagement side wall 30 to the pyramidal shape 68. For the 2-inch drop, 2×2 hitch of the preferred embodiment, the apex is vertically positioned about 1½ inches below the top surface of the hitch engagement 22, about ½ inch above the bottom surface of the hitch engagement 22 and the top surface of the hitch tongue 24. One of the edges 70 of the pyramidal shape 68 extends vertically upward, and joins into the break line 66 of the upper face 60 of the bridge portion 26. The trailing edge 72 of the pyramidal shape 68 extends to the bottom edge 56 of the hitch tongue 24. Because the apex of the pyramid 68 is at the same width as the hitch tongue 24, the vertical edge 70 and the trailing edge 72 of the pyramidal shape 68 both extend in a vertical plane parallel to the longitudinal axis of the hitch 20. The leading edge 74 of the pyramidal shape 68 extends from the apex forward to the bottom edge 38 of the side wall 30 of the hitch engagement 22.

As best shown in FIGS. 10 and 11, the pyramidal shape 68 and particularly the vertical edge 70 of the pyramidal shape 68 are provided by increasing side wall thickness. This region of increase side wall thickness associated with the pyramidal shape 68 better transfers stress between the hitch tongue 24 and the hitch engagement 22.

In the preferred embodiment, the recess 34 of the hitch engagement 22 is continued forward through the bridge portion 26 and the hitch tongue 24. The walls of the bridge plate 44 are preferably given the same thickness as the top wall thickness of the hitch engagement 22. The hitch tongue 24 includes side walls 76 and a top wall 78, both of which are again given the wall thickness of the walls 30, 32 of the hitch engagement 22. Thus, the entire depicted structure of the preferred embodiment has a uniform wall thickness other than the stress pyramids 68. The stress pyramids 68 are the only locations in the preferred embodiment of greater thickness. Carrying the recess 34 forward through the bridge portion 26 and the hitch tongue 24 significantly lowers the weight of the hitch 20 and amount of required material, and is permitted by the preferred manufacturing methods.

Thus, the bridge portion 26 provides a stress reduction connection between the hitch tongue 24 and the hitch engagement 22. With the recess 34 of the hitch engagement 22 extending forward, the stress reduction connection defines an open space therewithin. The stress pyramids 68 provide a strength bridge located above the plane of the hitch tongue 24 and above the bottom of the hitch engagement 22 and which extends out wider than the hitch engagement 22.

In many prior art hitches, the hitch engagement is provided as a hitch tube, and the hitch tongue is commonly formed from a separate plate of metal, bent into the desired configuration. The hitch tongue and the hitch tube are then joined together, such as by welding. The hitch 20 of the present invention, in one aspect, includes a hitch engagement 22, bridge portion 26 and hitch tongue 24 formed of a single, monolithic integral piece of metal. If desired, the monolithic hitch 20 can be formed by machining or by casting. Alternatively, if sufficiently strong materials can be obtained, the monolithic hitch 20 could be formed by injection molding or sintering. In the preferred method, the monolithic hitch 20 is formed by forging. A single billet of metal is placed into a forging press, such as a 20 ton press. The single billet is then hit with a vertically oriented compression force between tool halves to form the monolithic hitch structure. With the front wall 36 of the hitch engagement 22 and the bridge plate 44 of the bridge portion 26 disposed at the substantial angles 40, 42 shown, it has been found the forging can be satisfactorily achieved to obtain the desired side wall thicknesses and heights of the preferred embodiment. The through holes 28 and the ball hole 46 are preferably drilled or otherwise machined into the monolithic structure after forging the shape of the hitch 20. The hitch 20 may be forged out of aluminum, or even out of steel (such as 1040 steel).

After the final shape is obtained, the hitch 20 may be finished as known in the prior art, such as with plating or powder finish operations. With the preferred forging operation, the hitch 20 can be generously radiused at all edges. Providing generous radiuses eliminates sharp corners which could hurt a user's hand when pulling on the hitch 20 to attach a load. Providing generous radiuses also helps to avoid cracks in the plating or powder finish which could lead to corrosion locations.

Depending upon the forging tools used, the one location for more difficult material flow requirements involves the top wall 78 of the hitch tongue 24 associated with the recess 52 for the top surface of the ball mount hole 46. If desired, this recessed region 52 may be forged to a thinner wall thickness than the overall value (0.31 inches) of the rest of the hitch 20 (other than the stress pyramids 68). If the top wall 78 of the hitch tongue 24 is forged thinner than otherwise desired to achieve the ball mount recess 52, the ball mount recess 52 may be reinforced such as by welding a reinforcing ring (not separately shown) to the bottom surface of the top wall 78 of the hitch tongue 24 and around the ball mount hole 46.

Figure 14:
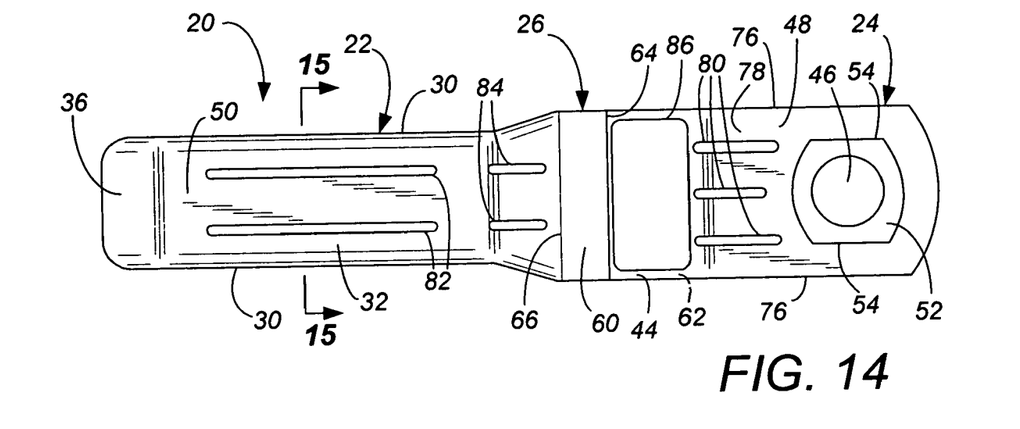
FIG. 14 is a top plan view of a second embodiment of a hitch in accordance with the present invention.
Figure 15:
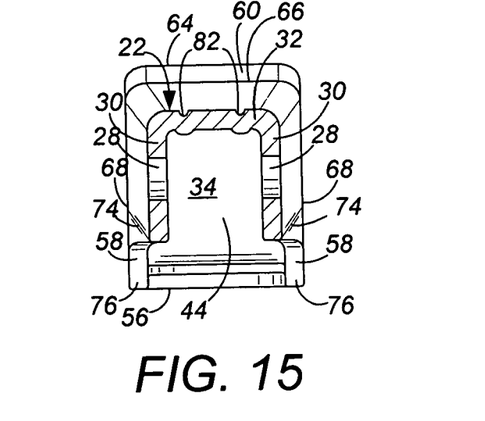
FIG. 15 is a cross-sectional view taken along lines 15—15 in FIG. 14.

With the hitch formed in a casting, machining, stamping or forging process, stabilizer vanes or reinforcement ribs can be formed which run longitudinally to increase strength. FIGS. 14 and 15 show such an embodiment. Three ribs 80 are provided at the bend between the bridge portion 26 and the hitch tongue 24. Two ribs 82 are provided along the top wall 32 of the hitch engagement 22. Two short ribs 84 are provided at the top wall of the bridge portion 26. More, less or no reinforcement ribs could be used depending upon the desired strength characteristics. The reinforcement ribs help to triangulate and strengthen the hitch in transferring loads. In the preferred embodiment of FIGS. 14 and 15, the reinforcement ribs 80, 82, 84 project downward on both the top and bottom surfaces, i.e., without affecting the constant wall thickness. While the ribs 80 on the hitch tongue 24 and the ribs 84 on the bridge portion 26 could project either upwards or downward, it is important that the ribs 82 on the hitch engagement 22 project downward so as not to exceed the (2×2) size of the hitch receiver opening.

Another optional feature which can be included on the hitch is a small indentation 86 on the trailing surface 62 of the bridge portion 26. The trailing surface 62 of the bridge portion 26 is the most visible portion of the hitch, particularly when installed on a hitch receiver but prior to attachment of the ball. Accordingly, the small indentation 86 can be used as an advertising surface as desired. If desired, an advertisement may be stamped on the trailing surface 62 of the bridge portion 26.

Figures 16, 17:
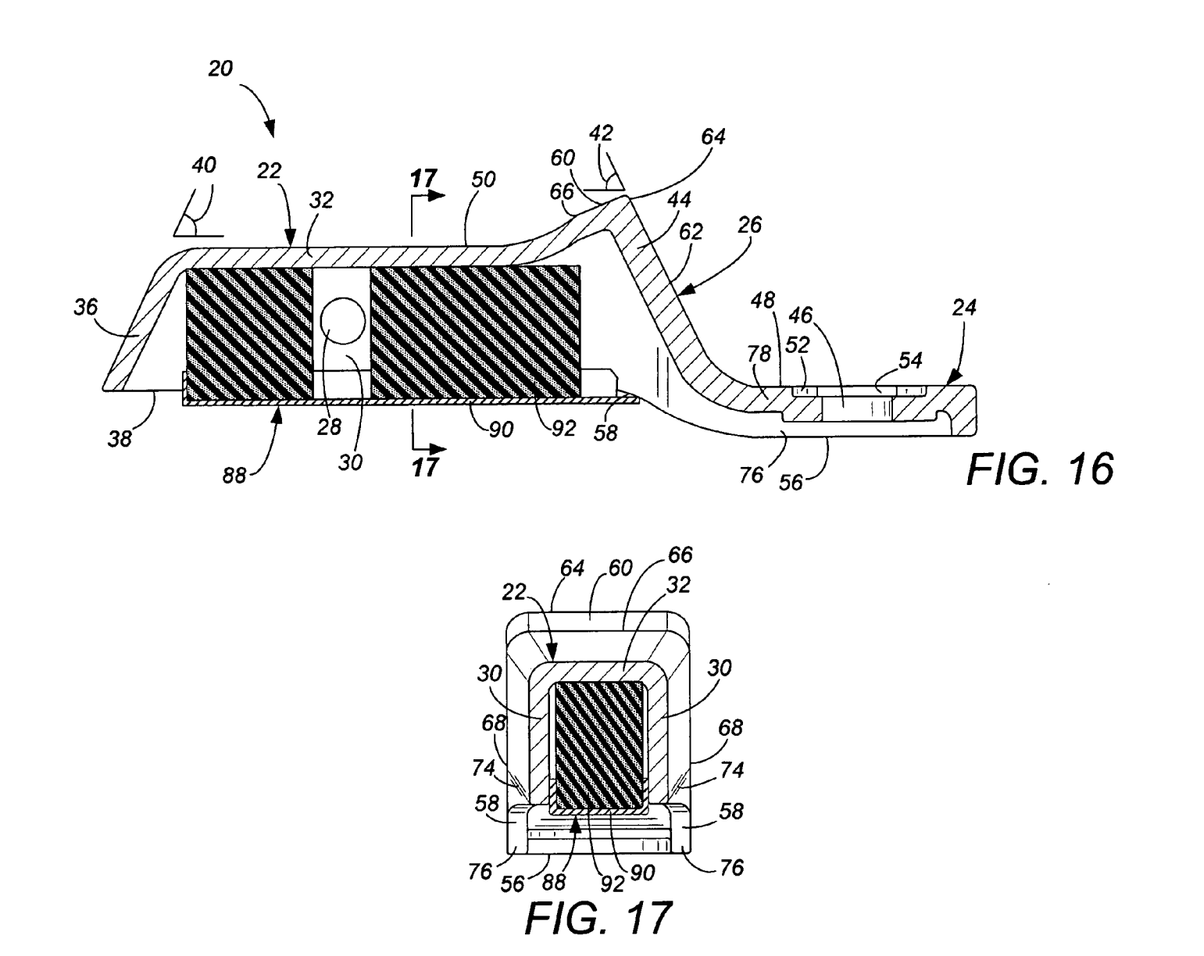
FIG. 16 is a cross-sectional view similar to FIG. 8 of a third embodiment of a hitch in accordance with the present invention.
FIG. 17 is a cross-sectional view taken along lines 17—17 in FIG. 16.

FIGS. 16 and 17 depict an alternative embodiment which uses an accessory made available by using the hitch 20 of the present invention including the recess 34 on the hitch engagement 22. An anti-vibration device 88 is provided which mates with the recess 34. The anti-vibration device 88 is compressible and provides a small force biasing the hitch engagement 22 against the hitch receiver tube. The anti-vibration device 88 is helpful particularly in unloaded situations (when nothing is being towed), keeping the hitch 20 from rattling around on a less than perfect fit in the hitch receiver.

The preferred anti-vibration device 88 includes a horizontally extending plate 90 sized to match the bottom size and shape of the recess 34 between the bottom edges 38 of the side walls 30. For instance, the plate 90 may be formed by stamp-cutting and bending a piece of sheet steel. Not supporting any towing load, the plate 90 may be quite thin and therefore lightweight and inexpensive. For instance, the preferred plate 90 has a thickness of only about 0.1 inches. If desired for weight and cost purposes, this plate 90 could be formed out of lighter and less expensive materials, such as any of numerous injection molded plastics.

The plate 90 is biased downward by a compression force, which equally and oppositely biases the hitch 20 upward. In the preferred embodiment, the compression force is provided by a foam rubber pad 92 positioned between the plate 90 and the undersurface of the top wall 32. The foam rubber should be able to withstand moisture, and have an extended memory life, i.e., continue to provide a compression force despite months or years of compression. The pad 92 should also be positioned so as not to interfere with the locking pin through holes 28. This may be easily accomplished, as shown, by using two separate pad portions leaving a gap for the locking pin holes 28, or in many other equivalent ways.

In the preferred embodiment, the pad 92 has an unbiased thickness which positions the plate 90 about ½ inch below the bottom edge 38 of the side walls 30. The compression force to push the plate 90 ½ inch upward (compressing the pad 90) and insert the hitch 20 into the hitch receiver is not great, such as in the range of 5 to 50 pounds. The anti-vibration device 88 accordingly provides a similar force (5 to 50 pounds), to keep the hitch 20 from rattling around in the hitch receiver. The compression force could alternatively be provided by a number of other mechanisms, such as springs. If desired, the anti-vibration device 88 may be retained within the recess 34 either by transverse compression of the pad 92 or with adhesive, glue, or other attachment devices. The pad 92 of the preferred embodiment is quite lightweight and inexpensive relative to other compression force mechanisms.

Although the present invention has been described with reference to preferred embodiments, workers skilled in the art will recognize that changes may be made in form and detail without departing from the spirit and scope of the invention.

The invention claimed is:

1. A hitch for use with a hitch receiver of a towing vehicle comprising:
    a hitch tongue for supporting a ball of a ball hitch; and
    a hitch engagement projecting from the hitch tongue, the hitch engagement sized to be received by longitudinal insertion in the hitch receiver of the towing vehicle, the hitch engagement extending about a longitudinal axis between a leading end and a trailing end, the hitch engagement comprising a left side wall running longitudinally, a right side wall running longitudinally and a connecting wall running longitudinally between the left side wall and the right side wall, the left side wall, the right side wall and the connecting wall together defining a recess exposed on either the top or the bottom of the hitch engagement.

2. The hitch of claim 1, wherein the hitch tongue and the hitch engagement are formed as a single, integral, monolithic metal structure.

3. The hitch of claim 1, further comprising aligned holes through the left side wall and through the right side wall for receiving a hitch pin therethrough.

4. The hitch of claim 1, wherein the hitch engagement further comprises a front wall.

5. The hitch of claim 4, wherein the front wall extends at a non-perpendicular angle relative to the longitudinal axis defined by the hitch engagement.

6. The hitch of claim 1, further comprising strengthening ribs running longitudinally on at least one of the left side wall, the right side wall and the connecting wall.

7. A hitch for use with a hitch receiver of a towing vehicle comprising:
    a hitch tongue for supporting a ball of a ball hitch, the hitch tongue extending generally horizontally in use and having a top surface defining a generally horizontal hitch plane, such that the ball of the ball hitch can be attached to the hitch tongue vertically above the hitch tongue; and
    a hitch engagement projecting from the hitch tongue, the hitch engagement sized to be received in the hitch receiver of the towing vehicle, the hitch engagement extending about a longitudinal axis which is generally horizontal in use;
    wherein the hitch tongue and the hitch engagement are formed as a single integral monolithic metal structure; and
    wherein the hitch engagement defines a recess providing at least one half of the perimetric volume of the hitch engagement.

8. A hitch for use with a hitch receiver of a towing vehicle comprising:
    a hitch tongue for supporting a ball of a ball hitch;
    a hitch engagement sized to be received in the hitch receiver of the towing vehicle, wherein the hitch engagement has a generally uniform side wall thickness extending longitudinally; and
    a connection bridge between the hitch tongue and the hitch engagement, wherein the connection bridge includes opposing side walls extending longitudinally and of greater thickness than the side walls of the hitch engagement.

9. A hitch for use with a hitch receiver of a towing vehicle comprising:
    a hitch tongue for supporting a ball of a ball hitch;
    a hitch engagement sized to be received in the hitch receiver of the towing vehicle, wherein the hitch engagement has a generally uniform side wall thickness; and
    a connection bridge between the hitch tongue and the hitch engagement, wherein the connection bridge includes side walls of greater thickness than the side walls of the hitch engagement, wherein the side walls of greater thickness of the connection bridge provide a pyramidal profile.

10. A hitch for use with a hitch receiver of a towing vehicle comprising:
    a hitch tongue for supporting a ball of a ball hitch, the hitch tongue extending generally horizontally and having a top surface defining a hitch plane;
    a hitch engagement sized to be received in the hitch receiver of the towing vehicle, wherein the hitch engagement has a generally uniform height and width, the hitch engagement having a bottom defining a generally horizontal base plane; and
    a stress reduction connection between the hitch tongue and the hitch engagement, the stress reduction connection defining an open space therewithin, the stress reduction connection comprising a strength bridge disposed above the hitch plane and above the base plane, the strength bridge being wider than the width of the hitch engagement.

11. The hitch of claim 10, wherein the hitch tongue has a generally uniform width which is wider than the width of the hitch engagement, and wherein the strength bridge has a width about as wide or wider than the generally uniform width of the hitch tongue.

12. The hitch of claim 10, wherein the hitch engagement comprises side walls defining an open space therewithin which is contiguous with the open space of the stress reduction connection.

13. The hitch of claim 10, wherein the hitch engagement comprises side walls defining an open space therewithin which has a width equal to a width of the open space of the stress reduction connection.

14. A hitch for use with a hitch receiver of a towing vehicle comprising:

a hitch engagement sized to be received by longitudinal insertion in the hitch receiver of the towing vehicle, the hitch engagement extending about a longitudinal axis between a leading end and a trailing end, the hitch engagement comprising first, second and third walls running longitudinally from the trailing end and the leading end and terminating in a front wall extending transverse to the longitudinal axis, wherein the first, second and third walls and the front wall are all formed of a single piece of metal, and wherein the first, second and third walls and front wall jointly enclose an open space.

15. The hitch of claim 14, wherein the front wall extends with a slope to the longitudinal axis.

16. A hitch for use with a hitch receiver of a towing vehicle comprising:

a hitch engagement sized to be received by longitudinal insertion in the hitch receiver of the towing vehicle, the hitch engagement extending about a longitudinal axis between a leading end and a trailing end, the hitch engagement comprising first, second and third walls running longitudinally, the first, second and third walls together defining a recess exposed on the hitch engagement; and an anti-vibration device disposed substantially within the recess and extending beyond a profile provided by the first, second and third walls, such that the anti-vibration device is exposed on the hitch engagement for biasing against the hitch receiver of the towing vehicle and for holding the hitch engagement against an opposing side of the hitch receiver.

17. The hitch of claim 16, wherein the anti-vibration device comprises a compressible pad.

18. The hitch of claim 16, wherein the anti-vibration devices comprises a resilient biasing structure compressible against an interior surface of the hitch engagement.

* * * * *